United States Patent
Mitchell et al.

(10) Patent No.: US 10,161,811 B2
(45) Date of Patent: Dec. 25, 2018

(54) DISTRIBUTED TEMPERATURE SENSOR ENHANCEMENT BY STIMULATED RAMAN SUPPRESSION

(71) Applicants: Ian Mitchell, Radford, VA (US); William Johnston, Blacksburg, VA (US); Ashwin Chandran, Christianburg, VA (US)

(72) Inventors: Ian Mitchell, Radford, VA (US); William Johnston, Blacksburg, VA (US); Ashwin Chandran, Christianburg, VA (US)

(73) Assignee: BAKER HUGHES, Houston, TX (US)

( * ) Notice: Subject to any disclaimer, the term of this patent is extended or adjusted under 35 U.S.C. 154(b) by 604 days.

(21) Appl. No.: 14/664,222

(22) Filed: Mar. 20, 2015

(65) Prior Publication Data

US 2015/0292956 A1 Oct. 15, 2015

Related U.S. Application Data

(60) Provisional application No. 61/979,195, filed on Apr. 14, 2014.

(51) Int. Cl.
*G01K 11/32* (2006.01)

(52) U.S. Cl.
CPC ................. *G01K 11/3206* (2013.01)

(58) Field of Classification Search
CPC ............. G01K 11/32; G01K 2011/324; G01K 11/3206; E21B 47/065; B41M 5/24; B41M 5/245
See application file for complete search history.

(56) References Cited

U.S. PATENT DOCUMENTS

| | | | | |
|---|---|---|---|---|
| 5,765,948 A | * | 6/1998 | Sai | G01K 11/32 250/227.14 |
| 6,181,465 B1 | * | 1/2001 | Grubb | G02B 6/02 359/337 |
| 6,374,003 B1 | | 4/2002 | Ding et al. | |
| 6,374,006 B1 | * | 4/2002 | Islam | H01S 3/302 359/334 |
| 2006/0239330 A1 | * | 10/2006 | Yamate | G01K 11/32 374/161 |
| 2007/0165691 A1 | | 7/2007 | Taverner et al. | |

(Continued)

OTHER PUBLICATIONS

International Search Report and Written Opinion for PCT Application No. PCT/US2015/020688, dated Jun. 26, 2015, pp. 1-13.

(Continued)

*Primary Examiner* — Kristal Feggins
(74) *Attorney, Agent, or Firm* — Cantor Colburn LLP

(57) ABSTRACT

A distributed temperature sensor and a method of determining temperature are described. The distributed temperature sensor includes an optical fiber to filter or remove Stokes Raman scatter and prevent stimulated Raman scatter and a light source to inject light into the optical fiber. The distributed temperature sensor also includes a photodetector to detect light energy resulting from the light injected into the optical fiber, the light energy including anti-Stokes Raman scatter and Rayleigh scatter; and a processor to determine temperature based on a ratio of the anti-Stokes Raman scatter and the Rayleigh scatter.

14 Claims, 4 Drawing Sheets

(56) References Cited

U.S. PATENT DOCUMENTS

| | | | |
|---|---|---|---|
| 2007/0223556 A1* | 9/2007 | Lee | G01K 11/32 |
| | | | 374/1 |
| 2009/0252193 A1 | 10/2009 | Hill et al. | |
| 2010/0128756 A1* | 5/2010 | Lee | G01K 11/32 |
| | | | 374/161 |
| 2013/0208762 A1 | 8/2013 | Mitchell et al. | |
| 2014/0233600 A1* | 8/2014 | Lee | G01K 15/005 |
| | | | 374/1 |

OTHER PUBLICATIONS

Jansen et al., "Modeling the inhibition of stimulated Raman scattering in passive and active fibers by lumped spectral filters in high power fiber laser systems", Optics Express, vol. 17, No. 18, Aug. 31, 2009, pp. 1-11.

Nodop et al., "Suppression of stimulated Raman scattering employing long period gratings in double-clad fiber amplifiers", Optics Letters, vol. 35, No. 17, Sep. 1, 2010, pp. 2982-2984.

* cited by examiner

DISTRIBUTED TEMPERATURE SENSOR ENHANCEMENT BY STIMULATED RAMAN SUPPRESSION

CROSS-REFERENCE TO RELATED APPLICATION

This application is a Non-Provisional of U.S. Provisional Patent Application Ser. No. 61/979,195 filed Apr. 14, 2014, the disclosure of which is disclosure of which is incorporated by reference herein in its entirety.

BACKGROUND

Distributed temperature sensors (DTS) are optoelectronic devices that measure temperature using optical fibers. When light is transmitted in an optical fiber, the photons may be elastically scattered (Rayleigh scattering) and inelastically scattered (Raman scattering and Brillouin scattering). In Raman scattering, the scattered photon may have less energy than the incident photon (Stokes Raman scattering) due to absorption of energy by the fiber or the scattered photon may have more energy than the incident photon (anti-Stokes Raman scattering) due to loss of energy by the fiber. A ratio of the anti-Stokes Raman scattering to the Stokes Raman scattering may be used to determine the temperature.

SUMMARY

According to one aspect of the invention, a distributed temperature sensor includes an optical fiber configured to filter or remove Stokes Raman scatter and prevent stimulated Raman scatter; a light source configured to inject light into the optical fiber; a photodetector configured to detect light energy resulting from the light injected into the optical fiber, the light energy including anti-Stokes Raman scatter and Rayleigh scatter; and a processor configured to determine temperature based on a ratio of the anti-Stokes Raman scatter and the Rayleigh scatter.

According to another aspect of the invention, a method of determining temperature includes configuring an optical fiber to filter or remove Stokes Raman scatter and prevent stimulated Raman scatter; arranging the optical fiber in an area where the temperature is to be determined; disposing a light source to inject light into the optical fiber; disposing a photodetector to detect light energy resulting from the light injected into the optical fiber, the light energy including anti-Stokes Raman scatter and Rayleigh scatter; and processing the light energy to determine the temperature based on a ratio of the anti-Stokes Raman scatter and the Rayleigh scatter.

BRIEF DESCRIPTION OF THE DRAWINGS

Referring now to the drawings wherein like elements are numbered alike in the several Figures.

DETAILED DESCRIPTION

As noted above, a distributed temperature sensor (DTS) may use a ratio of the anti-Stokes Raman scattering to the Stokes Raman scattering to determine temperature. The (spontaneous) Raman scattering is in all direction including along the fiber (both toward and away from the light source). The Raman scattering going along the fiber away from the light source co-propagating with the incident light (subsequent pulses of light emitted by the light source going long the fiber away from the light source) results in stimulated Raman scattering when a certain power threshold is reached. The result of stimulated Raman scattering is an increase in the total Raman scattering rate that is beyond that of spontaneous Raman scattering. That is, the presence of Stokes photons (in the co-propagating Raman scattering) enhances the Stokes Raman scattering process, resulting in an effective amplification of Stokes Raman scattering and depletion of the primary light pulse. Because the stimulated Raman scattering is a non-linear optical effect, temperature measurement, which requires the fiber to act as a linear sensor, is negatively effected. In existing DTS systems, the intensity of incident light into the fiber is limited in order ensure that the power threshold for stimulated Raman scattering is not reached. However, limiting the incident light intensity also limits the signal levels used to determine temperature and, thus, the accuracy of temperature measurements. Embodiments of the systems and methods described herein relate to filtering the Stokes Raman scattering along the fiber to facilitate the use of higher intensity incident light without achieving stimulated Raman scattering. Because Stokes Raman scattering is filtered and unsuitable for use in temperature calculation, temperature is then determined based on a ratio of anti-Stokes Raman scattering to Rayleigh scattering.

Figure 1:
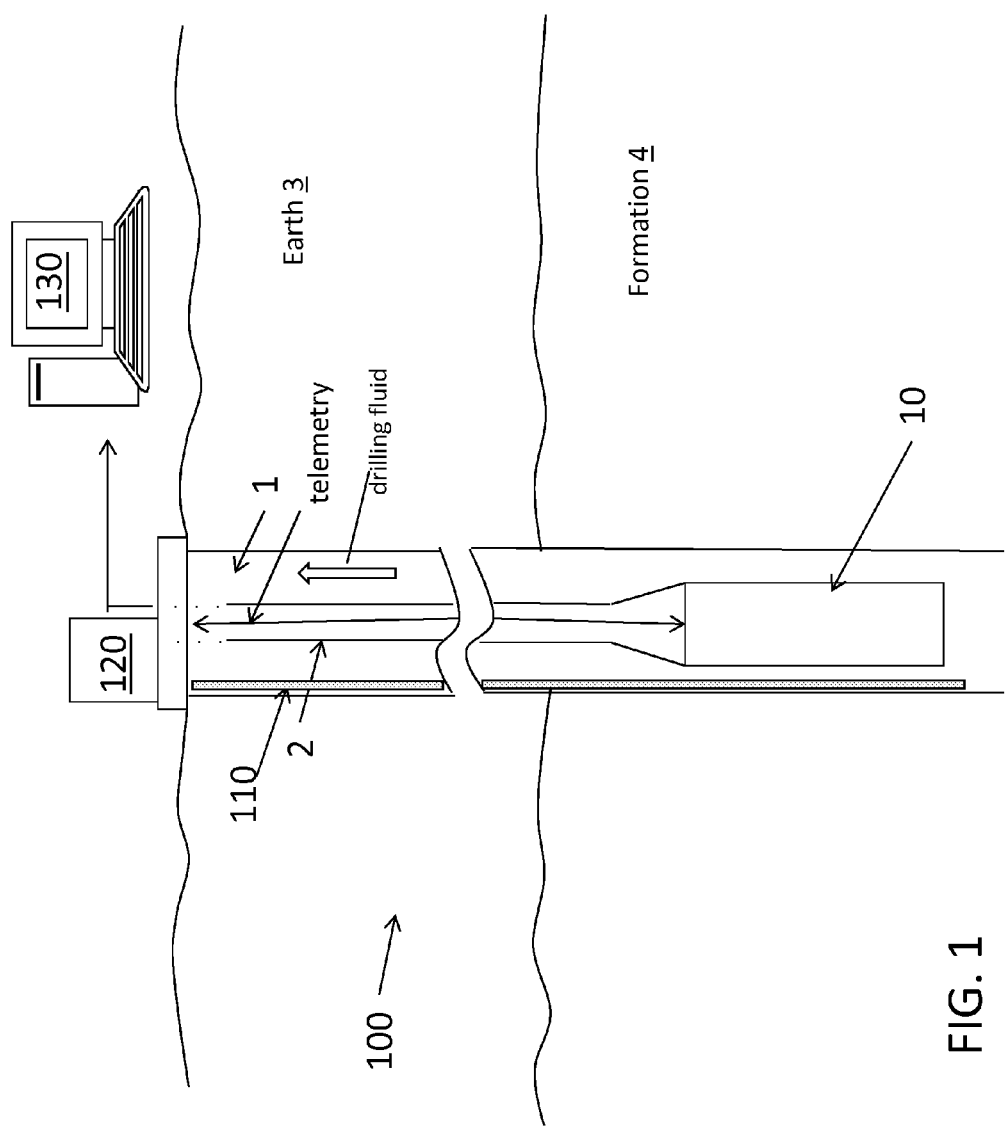
FIG. 1 is a cross-sectional illustration of a borehole and a distributed temperatures sensor (DTS) according to embodiments of the invention.

FIG. 1 is a cross-sectional illustration of a borehole 1 and a distributed temperatures sensor (DTS) 100 according to embodiments of the invention. The arrangement shown in FIG. 1 is one exemplary use of the DTS 100. While the DTS 100 may be used in other environments and in other subsurface arrangements, the exemplary DTS 100 shown in FIG. 1 is arranged to measure temperature in a borehole 1 penetrating the earth 3 including a formation 4. A set of tools 10 may be lowered into the borehole 1 by a string 2. In embodiments of the invention, the string 2 may be a casing string, production string, an armored wireline, a slickline, coiled tubing, or a work string. In measure-while-drilling (MWD) embodiments, the string 2 may be a drill string, and a drill would be included below the tools 10. Information from the sensors and measurement devices included in the set of tools 10 may be sent to the surface for processing by the surface processing system 130 via a fiber link or telemetry. The surface processing system 130 (e.g., computing device) includes one or more processors and one or more memory devices in addition to an input interface and an output device. The DTS 100 includes an optical fiber 110 (the device under test, DUT). Embodiments of the optical fiber 110 are further detailed below. The DTS 100 also includes an interrogation unit 120 that includes a coherent light source 210 and one or more photodetectors 220, as discussed with reference to FIG. 2. As shown in the exemplary arrangement of FIG. 1, the interrogation unit 120 may be located at the surface. In the exemplary arrangement shown in FIG. 1, the DTS 100 detailed below is used to determine downhole temperature and may be used to monitor the pipeline. In alternate embodiments, the DTS 100 described herein may be used in a water column or a subsea environment.

Figure 2:
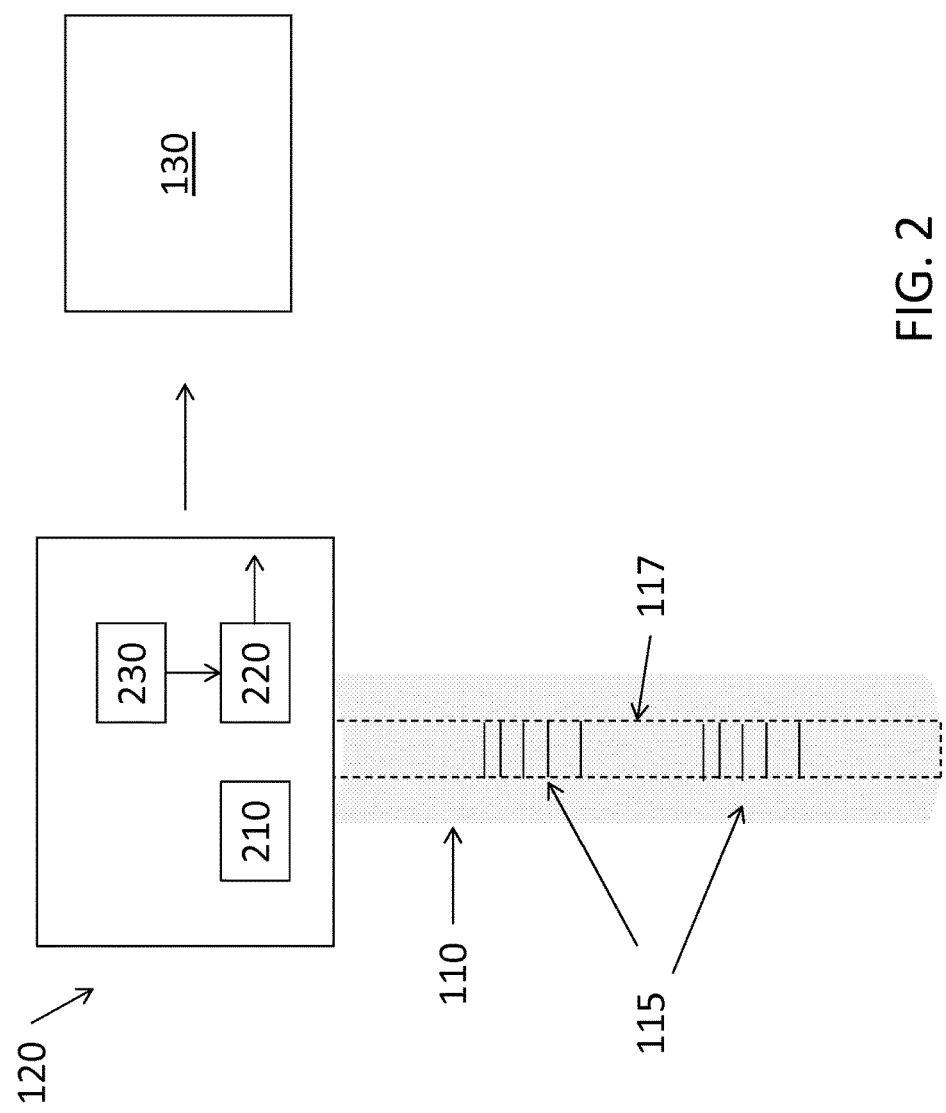
FIG. 2 details the DTS shown in FIG. 1 according to embodiments of the invention.

FIG. 2 details the DTS 100 shown in FIG. 1 according to one embodiment of the invention. The DTS 100 includes an interrogation unit 120, a light source 210, and one or more photodetectors 220 to receive the reflected signals or scatter from the optical fiber 110. The interrogation unit 120 may additionally include a processing system 230 with one or more processors and memory devices to process the scatter and reflections. Alternately, the photodetectors 220 may output the reflection information to the surface processing system 130 for processing. While the DTS 100 is discussed specifically as a temperature detector, the DTS 100 and the arrangement of the optical fiber 110 and interrogation unit 120 may be used additionally to determine other parameters (e.g., strain) based on the reflections or backscatter detected by the one or more photodetectors 220. The light source 210 may be a coherent light source in which light waves are in phase with one another. The light source 210 may be a laser, for example. In an exemplary embodiment, the light source 210 emits pulses of light at the same wavelength and amplitude.

In the embodiment shown in FIG. 2, fiber Bragg gratings (FBGs) 115 are formed in the fiber core 117 of the fiber 110. Alternate embodiments for the optical fiber 110 are discussed below. Two FBGs 115 are shown in FIG. 2, but other numbers of FBGs 115 are contemplated to be arranged at regular or irregular intervals along the fiber core 117. The FBGs 115 are used to filter out the Stokes Raman scattering that may co-propagate down the optical fiber 110 with pulses of light emitted by the light source 210. The FBGs 115 are arranged with a distance d between them. The distance d is chosen to be small enough such that stimulated Raman scattering is not generated between the FBGs 115 but is also chosen to be large enough to be practical in terms of cost, loss, and other considerations. The FBGs 115 may be written into existing optical fiber 110 or manufactured using a draw tower process in which combines drawing the optical fiber 110 with writing the FBGs 115. The FBGs 115 are broadband chirped Bragg gratings. That is, there is a linear variation in the grating period. The reflected wavelength changes with the grating period. This is further detailed with reference to FIG. 3 below. According to embodiments of the invention, each FBG 115 has a grating structure designed to reflect a range of frequencies that include (and may be approximately centered near) wavelengths associated with the Stokes Raman scattering. For example, with a light source 210 emitting light at 1550 nano meters (nm), the resulting Stokes Raman scattering may have wavelengths centered at approximately 1640 nm with a range of 20 to 30 nm. As another example, with a light source 210 emitting light at 1064 nm, the resulting Stokes Raman scattering may have wavelengths centered at approximately 1117 nm with a narrower range of 10-15 nm. The incident light wavelength and anti-Stokes Raman scattering wavelength are not significantly reflected by the FBGs 115. By reflecting the Stokes Raman scattering, the FBGs 115 prevent the conditions needed to generate stimulated Raman scattering. With the stimulated Raman scattering being suppressed by the FBGs 115, the intensity of incident light from the light source 210 may be increased beyond levels that would be possible without the FBGs 115.

Figure 3:
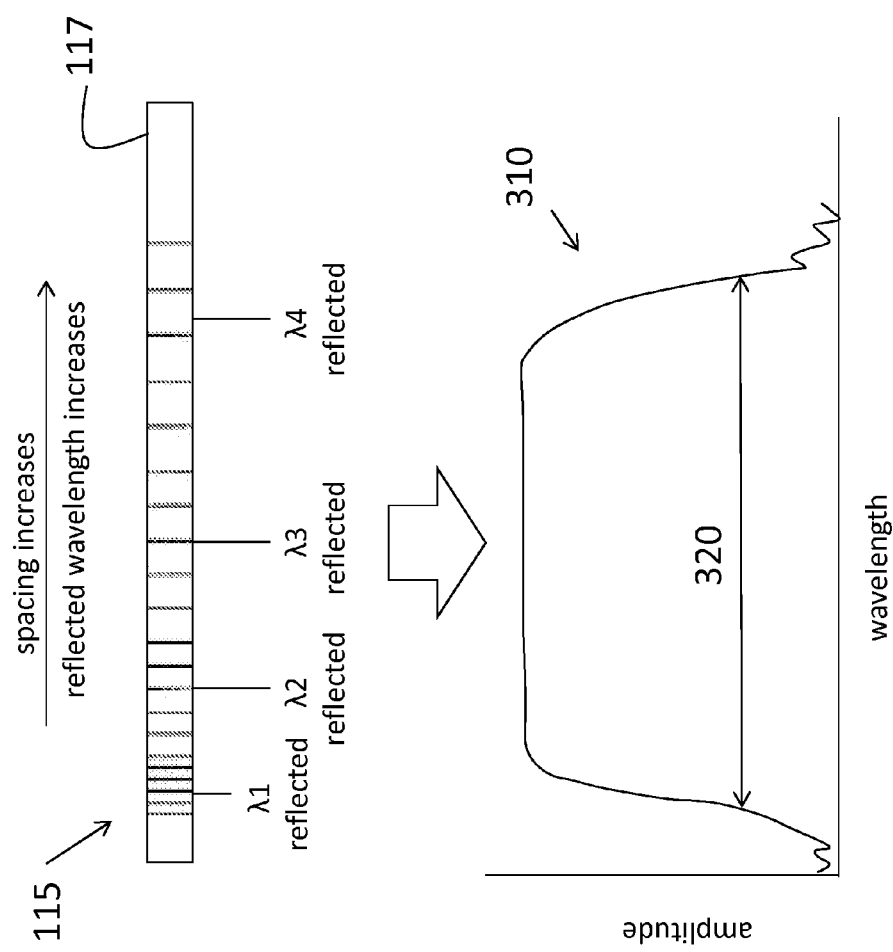
FIG. 3 illustrates an exemplary FBG according to an embodiment of the invention and the corresponding reflection spectrum.

FIG. 3 illustrates an exemplary FBG 115 according to an embodiment of the invention and the corresponding reflection spectrum. A portion of the fiber core 117 is shown. As indicated, as the spacing within the FBG 115 increases, the reflected wavelength also increases. That is, the reflected wavelength $\lambda 1$ is less than the reflected wavelength $\lambda 2$, which is less than the reflected wavelength $\lambda 3$, which is less than the reflected wavelength $\lambda 4$. As a result of the wideband chirped gratings of the FBG 115, the reflection spectrum 310 is generated. As the reflection spectrum 310 illustrates, a range of wavelengths corresponding to the chirp gratings of the FBG 115 are reflected by the FBG 115, while other wavelengths (e.g., wavelengths of anti-Stokes Raman scattering and incident light) are not reflected. That is, the wavelengths within the range 320 are reflected by the FBG 115 while wavelengths outside the range 320 are not. The wavelengths within the range 320 include wavelengths associated with the Stokes Raman scattering.

In alternate embodiments of the DTS 100, other types of optical fiber 110 (not including FBGs 115) may be used to provide absorption, reflection, loss, or a combination at Stokes Raman scattering wavelengths while leaving wavelengths associated with anti-Stokes Raman scattering and the incident light largely unaffected. The other types of optical fiber 110 may be, for example, doped optical fibers, optical fiber exposed to chemicals such as hydrogen, and optical fibers mechanically affixed, positioned, stressed, or constructed to produce loss at desired wavelengths. Whether the stimulated Raman scattering is prevented based on the optical fiber 110 including the FBGs 115 or based on the optical fiber 110 according to one of these alternate embodiments, the incident light intensity from the light source 210 may be increased as a result. The increase in incident light intensity increases the signal level (energy) of the anti-Stokes Raman scattering and Rayleigh scattering used to determine the temperature, thereby increasing accuracy of the temperature measurement.

Figure 4:
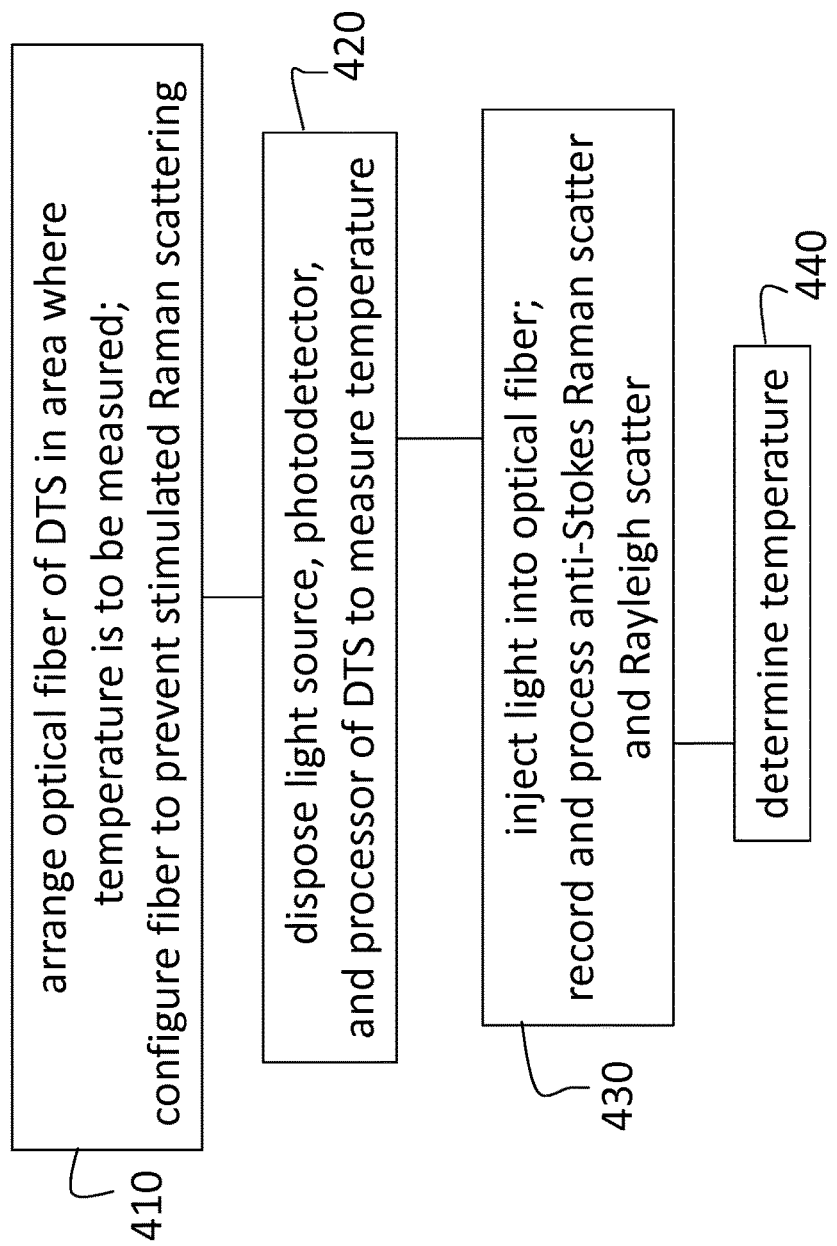
FIG. 4 is a process flow of a method of measuring temperature according to embodiments of the invention.

FIG. 4 is a process flow of a method of measuring temperature according to embodiments of the invention. At block 410, arranging an optical fiber 110 of a DTS 100 in an area where temperature is to be measured may include disposing the optical fiber 110 downhole as shown in FIG. 1, for example. Configuring the optical fiber to prevent stimulated Raman scattering at block 410 includes configuring the optical fiber 110 to reflect, absorb, or otherwise cause loss at the Stokes Raman wavelength. This configuring includes manufacturing the optical fiber 110 with the FBGs 115, doping the fiber 110, exposing the fiber 110 to chemicals, or affixing the optical fiber 110, as noted above. At block 420, the process includes disposing the light source 210, photodetector 220, and processor 130, 230 of the DTS 100 to measure temperature. At block 430, injecting light into the optical fiber 110 includes injecting light with an intensity higher than is possible without the optical fiber 110 configured as described with reference to block 410. That is, when the optical fiber 110 is configured to prevent stimulated Stokes Raman scattering, higher light intensity may be injected by the light source 220 into the optical fiber 110 without generating non-linear effects. Recording and processing anti-Stokes Raman scatter and Rayleigh scatter resulting from the injected light, at block 430, is based on the fact that the optical fiber 110 does not reflect, absorb, or otherwise cause loss at wavelengths related to the anti-Stokes Raman scatter and Rayleigh scatter. Determining temperature at block 440 is based on a ration of the anti-Stokes Raman scatter to the Rayleigh scatter detected by the one or more photodetectors 220.

The signal intensity of the anti-Stokes Raman scatter AS is proportional to:

$$AS \approx \left(\frac{1}{\lambda_{as}}\right)^4 \frac{e^{-\frac{\sigma}{T}}}{1 - e^{-\frac{\sigma}{T}}} \quad \text{[EQ. 1]}$$

$\lambda_{as}$ is the anti-Stokes Raman scatter wavelength, T is temperature, and σ represents all temperature independent constants and is given by:

$$\sigma \equiv \frac{hc\upsilon}{k_b} \quad \text{[EQ. 2]}$$

h is Planck's constant ($6.26 \times 10^{-34}$ Joule seconds), c is the speed of light ($3 \times 10^8$ meters per second), $\upsilon$ is the Raman frequency shift, and $k_b$ is Boltzmann's constant ($1.3 \times 10^{-23}$ Joules/Kelvin). The signal intensity of the Rayleigh scatter RA is given by:

$$RA = \frac{8\pi^3}{3}\left(\frac{1}{\lambda_{RA}}\right)^4 n^8 p^2 k_b t_f \beta \quad \text{[EQ. 3]}$$

$\lambda_{RA}$ is the Rayleigh scatter wavelength, $t_f$ is the fictive temperature or the temperature at which the optical fiber 110 undergoes a phase change, n is the index of refraction, and β is isothermal compressibility. As EQ. 3 indicates, there are no temperature-dependent terms in RA. The temperature may be computed as:

$$temp = \frac{AS}{RA} = \left(\frac{\lambda_{RA}}{\lambda_{AS}}\right)^4 \cdot \frac{e^{-\frac{\sigma}{T}}}{1 - e^{-\frac{\sigma}{T}}} \cdot \frac{3}{8\pi^3} \cdot \frac{1}{n^8 p^2 k t_f \beta} \quad \text{[EQ. 4]}$$

by combining the constants as:

$$\kappa = \frac{3}{8\pi^3} \cdot \frac{1}{n^8 p^2 k t_f \beta} \quad \text{[EQ. 5]}$$

temperature may be calculated as:

$$temp = \kappa \cdot \left(\frac{\lambda_{RA}}{\lambda_{AS}}\right)^4 \cdot \frac{e^{-\frac{\sigma}{T}}}{1 - e^{-\frac{\sigma}{T}}} \quad \text{[EQ. 6]}$$

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A distributed temperature sensor, comprising:
   an optical fiber configured to filter or remove Stokes Raman scatter and including fiber Bragg gratings (FBGs) spaced to prevent stimulated Raman scatter;
   a light source configured to inject light into the optical fiber;
   a photodetector configured to detect light energy resulting from the light injected into the optical fiber, the light energy including anti-Stokes Raman scatter and Rayleigh scatter; and
   a processor configured to determine temperature based on a ratio of the anti-Stokes Raman scatter and the Rayleigh scatter.

2. The sensor according to claim 1, wherein the FBGs are configured to reflect the Stokes Raman scatter and prevent the stimulated Raman scatter.

3. The sensor according to claim 2, wherein the FBGs are broadband chirped gratings with a reflection wavelength spectrum that includes wavelengths associated with the Stokes Raman scatter.

4. The sensor according to claim 1, wherein the optical fiber is doped to produce loss at a wavelength corresponding with the Stokes Raman scatter.

5. The sensor according to claim 1, wherein the optical fiber is exposed to chemicals to produce loss at a wavelength corresponding with the Stokes Raman scatter.

6. The sensor according to claim 1, wherein the optical fiber is mechanically affixed or positioned or stressed to produce loss at a wavelength corresponding with the Stokes Raman scatter.

7. The sensor according to claim 1, wherein the optical fiber is disposed in a borehole and the sensor measures the temperature in the borehole.

8. A method of determining temperature, the method comprising:
   configuring an optical fiber to filter or remove Stokes Raman scatter and include fiber Bragg gratings (FBGs) spaced to prevent stimulated Raman scatter;
   arranging the optical fiber in an area where the temperature is to be determined;
   disposing a light source to inject light into the optical fiber;
   disposing a photodetector to detect light energy resulting from the light injected into the optical fiber, the light energy including anti-Stokes Raman scatter and Rayleigh scatter; and
   processing the light energy to determine the temperature based on a ratio of the anti-Stokes Raman scatter and the Rayleigh scatter.

9. The method according to claim 8, wherein the configuring the optical fiber includes the FBGs on the fiber core of the optical fiber to reflect the Stokes Raman scatter and prevent the stimulated Raman scatter.

10. The method according to claim 9, wherein the fabricating the FBGs includes fabricating broadband chirp gratings with a reflection wavelength spectrum that includes wavelengths associated with the Stokes Raman scatter.

11. The method according to claim 10, wherein the configuring the optical fiber includes doping the optical fiber to produce loss at a wavelength corresponding with the Stokes Raman scatter.

12. The method according to claim 10, wherein the configuring of the optical fiber includes exposing the optical fiber to chemicals to produce loss at a wavelength corresponding with the Stokes Raman scatter.

13. The method according to claim 10, wherein the configuring the optical fiber includes mechanically affixing or positioning or stressing the optical fiber to produce loss at a wavelength corresponding with the Stokes Raman scatter.

14. The method according to claim 8, wherein the arranging the optical fiber in the area where the temperature is to be determined includes disposing the optical fiber in a borehole.

* * * * *